United States Patent Office 3,003,994
Patented Oct. 10, 1961

---

3,003,994
POLYVINYL CHLORIDE STABILIZED WITH PRODUCTS OF ALLENE AND ACETYLENE
James Maurice Quinn, Tonawanda, N.Y., and Allan Kenneth Schneider, Wilmington, Del., assignors to E. I. du Pont de Nemours and Company, Wilmington, Del., a corporation of Delaware
No Drawing. Filed Mar. 4, 1959, Ser. No. 797,044
11 Claims. (Cl. 260—45.7)

This invention relates to the manufacture of shaped articles of polymeric halogenated hydrocarbons. More specifically, it relates to the stabilization of the polymeric halogenated hydrocarbons, particularly above their melting temperatures, for successful shaping into articles.

The invention will be described as it applies to polyvinyl chloride or copolymers of vinyl chloride having vinyl chloride as the major constituent, and their formation into films for use in packaging applications and the like. However, the invention is equally applicable to polymers and copolymers of vinyl fluoride and may be extended to include all polymeric materials whose thermal decomposition is at least partially attributed to the loss of halogen acid from the composition, thereby leading to discoloration; and the shaping of these polymeric materials into films, filaments, fibers, foils, coatings, etc. Besides polyvinyl chloride and polyvinyl fluoride, the invention applies to such polymeric materials as vinylidene chloride polymers, vinylidene chloride-vinyl chloride copolymers, vinylidene chloride-acrylonitrile copolymers, vinylidene fluoride polymers and copolymers, afterchlorinated polyvinyl chloride, chloroprene polymers, chlorosulfonated polyethylene, and the like.

Polyvinyl chloride is characterized by poor thermal stability, particularly at temperatures above its melting point. Thermal decomposition is evidenced by a browning of the normally white polymer. As degradation continues the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling, coalescence or solvent casting, without encountering the aforementioned difficulties. A further object is a polyvinyl chloride composition that can easily be melt-extruded into a useful film. Other objects will appear hereinafter.

The objects are accomplished by a composition of matter comprising the halogenated hydrocarbon polymer and 1–15% of at least one compound having at least one methylene-substituted carbocyclic group therein, said cyclic group selected from the class consisting of cycloolefinic and cycloparaffinic groups and having at least $2n$ carbon atoms where $n$ is an integer having a value of at least 3, preferably 3–4, said methylene-substitution providing from two to $n$ methylene radicals, each attached directly to carbon atoms of said cyclic group.

The preferred halogenated hydrocarbon polymers are those in which the halogen has an atomic weight of 19–36.

The stabilizer compounds for use in the compositions of this invention are derivable, at least in part, from allene and contain at least one non-aromatic closed ring structure, the carbocyclic group, having pendant to it and directly attached thereto at least two methylene groups. Being derivable from allene ($C_3H_4$), all of these compounds contain at least one grouping having the formula $C_3xH_4x-y$, where $x$ is an integer equal to the effective degree of polymerization of allene represented by the grouping and $y$ represents the degree of substitution upon the basic grouping.

For ease of explanation, these compounds will be discussed as three groups. The first group consists of reaction products of allene with itself, such as those whose preparation is described in U.S. Patent No. 2,839,510. The preferred compounds within this group are 1,2,4-trimethylenecyclohexane, 1,3,5-trimethylenecyclohexane and 1,3,5,7-tetramethylenecyclooctane. The structural formulas of these three compounds follow:

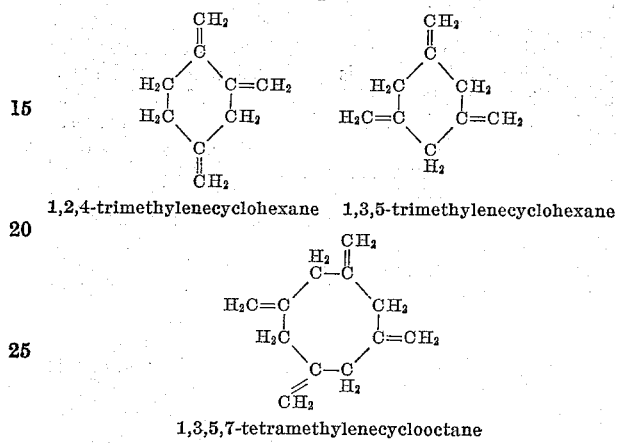

1,2,4-trimethylenecyclohexane   1,3,5-trimethylenecyclohexane 1,3,5,7-tetramethylenecyclooctane Polymers of the compounds of the first group, particularly polymers of 1,2,4-trimethylenecyclohexane, i.e., homopolymers and copolymers of this compound with other normally polymerizable mono- and diolefinic monomers, comprise the second group. The preparation of these polymers is also disclosed in U.S. Patent No. 2,839,510. The homopolymers of 1,2,4-trimethylenecyclohexane contain the following recurring unit, which is a methylene-substituted cyclic group:

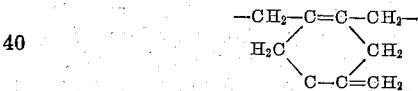

The terminal cyclic groups of the polymer will have at least two methylene groups attached thereto, one methylene group of the intermediate cyclic group serving as a site for polymerization.

The third group consists of compounds that can be obtained by reaction of allene with acetylenic hydrocarbons and polymers thereof. They are methylene-substituted cycloalkenes. They may be pictured as cyclic addition products of one mole of a monoacetylenic hydrocarbon, wherein at least one of the triply bonded carbon atoms has directly attached thereto a hydrocarbon radical, with from two to three moles of allene. These compounds and suitable methods of preparation are disclosed and claimed in co-pending U.S. patent application Serial No. 655,170 filed April 26, 1957, now U.S. Patent No. 2,957,035, issued October 18, 1960 to R. E. Benson and co-pending U.S. patent application Serial No. 657,703 filed May 8, 1957, now U.S. Patent No. 2,943,116, issued June 28, 1960 to R. E. Benson, both of which are assigned to the assignee of the present application. The structural formulas of the preferred compounds falling in this group follow:

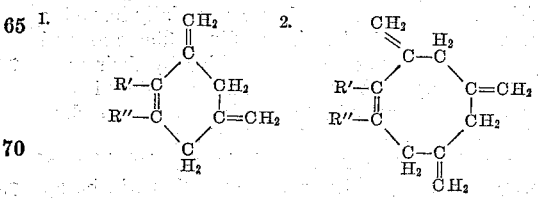

wherein R' and R" are selected from the group consisting of hydrogen and hydrocarbon radicals. The first compound may be prepared by the reaction of one mole of a monoacetylenic hydrocarbon with two moles of allene; the second compound, one mole of the monoacetylenic hydrocarbon with three moles of allene.

It should be noted that the methylene-substituted carbocyclic structures may be also substituted by cycloalkyl, aryl and straight chain alkyl and alkenyl groups higher than methylene, the attachment of the group to the carbocycle ring being through a terminal carbon atom of the group.

In order that the compounds used as stabilizers in the compositions of this invention remain present at the temperatures ordinarily used in preparing shaped structures of polyvinyl chloride by melt extrusion of substantially unplasticized polymer, it is preferred that they have a normal boiling point of at least about 160° C. This objective is realized in practice by specifying that the preferred compounds have a molecular weight greater than 120, i.e., greater than that corresponding to trimers of allene. Compounds having a molecular weight of 120 or below do show noticeable stabilizing action for polyvinyl chloride and other halogenated hydrocarbon polymers, however, and have great usefulness for example in the preparation of highly plasticized films of polyvinyl chloride in which relatively low temperatures of forming, e.g., below 160° C., are employed. Of the compounds having molecular weight greater than 120, the best results are obtained with those having at least one 8-membered ring and three or more methylene groups per compound.

The process for forming shaped structures involves blending a mixture of the halogenated hydrocarbon polymer and at least one of the stabilizer compounds specified previously; then heating the mixture until it is converted into a homogeneous single phase composition; and, thereafter, forming the homogeneous single phase into a shaped structure and cooling the structure.

The amount of the stabilizer used, particularly for the melt-extrusion of polyvinyl chloride films, should be enough to provide adequate thermal stability during the forming operation but not enough to affect the properties of the resulting film adversely. Concentrations of at least 1% of the stabilizer, based on the weight of the stabilizer plus polymer, have been found most useful. The maximum used will depend on the process of forming the shaped structures. However, the maximum concentration of the stabilizer remaining in the ultimate product is preferably no greater than 15%. For extrusion operations where only a minor portion of the stabilizer would be lost by evaporation during the forming operation, up to 15% may therefore be used in the starting mixture. In solvent casting, dispersion coalescence, or plasticized extrusion, where a larger proportion of the stabilizer may be evaporated during formation of the shaped structure, a still higher concentration, e.g., up to 25%, may be used in the starting composition.

Besides improving thermal stability and lowering the melt viscosity of the polymeric halogenated hydrocarbons, the stabilizer compounds of the compositions of this invention provide other advantages. They are compatible with the polymers over a wide range of compositions and therefore can be easily mixed uniformly with the polymers; also they show no tendency to exude to the surface of the ultimately produced polymeric articles. Thus, they do not interfere with post-processing operations such as the printing of films produced from these compositions. These compounds are essentially insoluble in water so that the final articles (films, filaments and the like) are not rendered water-sensitive by their presence. Most important, however, the films produced from these compositions are substantially clear and colorless, being virtually bubble-free and particle-free.

Specific embodiments falling within the definition of the process and composition of the invention will be apparent from the following examples. It is understood that the examples should not be considered to limit the scope of the present invention. In the examples, all parts are by weight unless otherwise specified.

Example 1

A mixture consisting of 90 parts of a polyvinyl chloride resin (the resin having an inherent viscosity of 1.21 deciliters per gram measured at 0.25% concentration in hexamethylphosphoramide at 30° C.) and 10 parts of 1,3,5,7-tetramethylenecyclooctane was prepared by ball milling the ingredients together for 60 minutes. A one gram sample of this mixture was pressed for 6 minutes between ferrotype plates under a total force of 30 tons in a Carver laboratory press heated to 210° C. The pressure was released and the resulting film was removed from between the plates. The film was clear and substantially free of bubbles and particles, and had only a very slight yellowish cast in 10 mil. thickness when viewed against a source of white light.

As a control, the 1,3,5,7-tetramethylenecyclooctane stabilizer was omitted. A one gram sample of the same polyvinyl chloride resin as above was pressed between ferrotype plates under a total force of 30 tons at 210° C. for only four minutes. When examined, the sample had been converted to a brownish-black, charred, nearly opaque film containing numerous black particles.

Examples 2–3

A mixture consisting of 90 parts of the polyvinyl chloride resin as in Example 1, 8 parts of 1,3,5,7-tetramethylenecyclooctane and 2 parts of "Lubricin" V-3 lubricant (a modified castor oil consisting principally of glyceryl triricinoleate manufactured by The Baker Castor Oil Company) was prepared. The mixture was melted and extruded at a temperature of 190° C. through a conventional 1-inch diameter extruder using a 6-inch wide flat die at a throughput rate of 12 pounds per hour. The film produced was transparent, free of bubbles and particles, and was substantially colorless when viewed in 10 mil. thickness against a source of white light. Its tensile strength was 5100 p.s.i., the elongation was 175% and the initial tensile modulus was 282,000 p.s.i. The tear strength was 81 grams per mil.

For Example 3, a mixture consisting of 88 parts of the polyvinyl chloride resin, 10 parts 1,3,5,7-tetramethylenecyclooctane and 2 parts of "Lubricin" V-3 lubricant was prepared. The mixture was melted and extruded as described in the preceding paragraph. The resulting film was transparent, free of bubbles and particles, and was essentially colorless when viewed against a source of white light. Its tensile strength was 6800 p.s.i., the elongation was 273% and the initial tensile modulus was 277,000 p.s.i. The tear strength was 143 grams per mil.

In a control experiment showing the effect of using no stabilizer for melt extrusion of the resin, a mixture of 98 parts of the same polyvinyl chloride resin as used above with 2 parts of "Lubricin" V-3 was fed into the extruder heated to 205° C. The mixture was converted to a bubbly, black mass part-way through the heated zone of the extruder and could not be extruded due to plugging of the equipment. Essentially the same results were obtained in other attempted experiments using this mixture at extrusion temperature ranging from 185° C. to 230° C. Below 185° C. the polyvinyl chloride resin did not coalesce.

Example 4

A mixture consisting of 88 parts of the polyvinyl chloride resin, 10 parts higher allene products (consisting of a mixture of 1,3,5,7-tetramethylenecyclooctane with smaller amounts of higher boiling methylene-substituted cyclic allene derivatives) and 2 parts "Lubricin" V-3 lubricant was prepared. The higher allene products had been prepared as a by-product in the preparation of 1,3,5,7- tetramethylenecyclooctane by the cyclopolymerization of five or more units of allene.

A one gram sample of the mixture was pressed for 6 minutes between ferrotype plates under a total force of 30 tons in a Carver laboratory press heated to 210° C. The resulting film was clear and substantially free of bubbles and particles, and was substantially colorless when viewed against a source of white light. The unsuccessful control experiment is identical to that described in Example 1.

*Examples 5–6*

A mixture consisting of 90 parts polyvinyl chloride resin, 8 parts of the higher allene products used in the preceding example and 2 parts "Lubricin" V-3 was prepared. The mixture was melted and extruded at a temperature of 195° C. through a conventional 1-inch diameter extruder using a 6-inch wide flat die at a throughput rate of 12 pounds per hour. The film produced was substantially free of bubbles and particles and had only a slight yellowish cast when viewed in 10 mil thickness against a source of white light.

In Example 6, 10 parts, instead of 8, of the higher allene products were used. The resulting film was transparent and had a more nearly colorless appearance than that of Example 5.

*Example 7*

A mixture consisting of 90 parts polyvinyl chloride resin and 10 parts, 1,2,4-trimethylenecyclohexane was prepared. A one gram sample of this mixture was pressed for 6 minutes between ferrotype plates under a total force of 30 tons in a Carver laboratory press heated to 210° C. The resulting film was clear and substantially free of particles, but had a somewhat brownish cast in 10 mil thickness when viewed against a source of white light.

As a control, the stabilizer was omitted and the unsuccessful results are those given in Example 1.

*Example 8*

A mixture consisting of 90 parts polyvinyl chloride resin and 10 parts 3,5,7-trimethylenecyclooctene (a reaction product of three moles of allene with one mole of acetylene) was prepared. A one gram sample of this mixture was pressed for six minutes as described above at 210° C. The resulting film was clear, substantially free of bubbles and particles, and had only a very slight yellowish cast in 10 mil thickness when viewed against a source of white light. (For the control experiment, see the last paragraph of Example 1.)

The compositions of this invention are useful in the preparation of shaped structures of all types. They are extremely useful in preparing films, filaments, fibers, foils and the like and as coatings for wood, metals, etc. However, their greatest utility is in the formation of self-supporting films for packaging applications. These films may be fabricated into sheets, envelopes, or tubes and used to package foodstuffs, textiles, hardware items, greased or untreated machine parts and similar materials. In sheet form the film may be used as a base for adhesive tape, sound recording tape, etc.

The invention contemplates the use of the particular compounds having at least one methylene-substituted (dimethylene or greater) carbocyclic group, i.e., specified allene reaction products, as the essential additives to polymeric compositions. These compounds may be used singly or in mixtures thereof. The present invention also contemplates the use of other ingredients along with the essential additives provided such ingredients do not detract from the function of the additives. Thus, the addition of pigments, dyes, delusterants, plasticizers, latent solvents, fillers, lubricants, additional thermal stabilizers, photo stabilizers, etc., in suitable amounts is understood to be within the purview of this invention.

Having fully disclosed the invention, what is claimed is:

1. A composition of matter comprising polyvinyl chloride and 1–15% of at least one stabilizing compound, said stabilizing compound being selected from the group consisting of the reaction product of the cyclopolymerization of allene and the reaction product of allene and acetylene.

2. A composition of matter as in claim 1 wherein said stabilizing compound is 1,2,4-trimethylenecyclohexane.

3. A composition of matter as in claim 1 wherein said stabilizing compound is 1,3,5-trimethylenecyclohexane.

4. A composition of matter as in claim 1 wherein said stabilizing compound is 1,3,5,7-tetramethylenecyclooctane.

5. A composition of matter as in claim 1 wherein said stabilizing compound is a polymer of 1,2,4-trimethylenecyclohexane.

6. A composition of matter as in claim 1 wherein said stabilizing compound is 3,5,7-trimethylenecyclooctene.

7. A process for forming shaped structures which comprises blending a mixture of polyvinyl chloride and 1–25% of at least one stabilizing compound, said stabilizing compound being selected from the group consisting of the reaction product of the cyclopolymerization of allene and the reaction product of allene and acetylene; heating said mixture to convert the mixture into a homogeneous single phase composition; forming said composition into a shaped structure and cooling said structure.

8. A process for forming a self-supporting film which comprises blending a mixture of polyvinyl chloride and 1–25% of at least one stabilizing compound, said stabilizing compound being selected from the group consisting of the reaction product of the cyclopolymerization of allene and the reaction product of allene and acetylene; heating said mixture to convert the mixture into a homogeneous single phase composition; extruding said composition in the form of a film and cooling said film.

9. A process as in claim 8 wherein said compound is 1,2,4-trimethylenecyclohexane.

10. A process as in claim 8 wherein said compound is 1,3,5,7-tetramethylenecyclooctane.

11. A process as in claim 8 wherein said compound is 3,5,7-trimethylenecyclooctene.

No references cited.